United States Patent
Likhanova et al.

(10) Patent No.: US 10,329,474 B2
(45) Date of Patent: Jun. 25, 2019

(54) HYDROPHOBIC COMPOUND EMULSIONS FREE OF SILICON AND FLUORINE FOR AN OIL RECOVERING METHOD THAT MODIFIES THE WETTABILITY OF ROCKS FROM HYDROPHILIC TO OLEOPHILIC

(71) Applicant: INSTITUTO MEXICANO DEL PETROLEO, Mexico City (MX)

(72) Inventors: Natalya Victorovna Likhanova, Mexico City (MX); Iryna Igorevna Demikhova, Mexico City (MX); Joaquin Rodolfo Hernandez Perez, Mexico City (MX); Andres Eduardo Moctezuma Berthier, Mexico City (MX); Crescencio Octavio Olivares Xometl, Mexico City (MX); Miguel Angel Cuapantecatl Mendieta, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 1285 days.

(21) Appl. No.: 14/306,706

(22) Filed: Jun. 17, 2014

(65) Prior Publication Data

US 2014/0367098 A1 Dec. 18, 2014

(30) Foreign Application Priority Data

Jun. 17, 2013 (MX) .................. A/2013/006892

(51) Int. Cl.
*C09K 8/58* (2006.01)
*E21B 43/16* (2006.01)
*C09K 8/26* (2006.01)

(52) U.S. Cl.
CPC .............. *C09K 8/58* (2013.01); *C09K 8/26* (2013.01); *E21B 43/16* (2013.01)

(58) Field of Classification Search
CPC .............. C09K 8/58; C09K 8/26; E21B 43/16
USPC ........................................................ 166/275
See application file for complete search history.

(56) References Cited

U.S. PATENT DOCUMENTS

| 4,074,536 | A | | 2/1978 | Young |
| 4,197,912 | A | | 4/1980 | Barnhouse |
| 4,230,182 | A | * | 10/1980 | Bousaid ................. C09K 8/584 166/270.1 |
| 4,296,812 | A | | 10/1981 | Kalfoglou |
| 5,630,474 | A | | 5/1997 | Burger et al. |
| 6,165,948 | A | | 12/2000 | Dewenter et al. |

OTHER PUBLICATIONS

Elewaut, K. et al., Investigation of a Novel Chemical for Bullhead Water Shutoff Treatments, 2005, SPE 94660.
(Continued)

*Primary Examiner* — Angela M DiTrani Leff
*Assistant Examiner* — Ashish K Varma
(74) *Attorney, Agent, or Firm* — Dickinson Wright PLLC

(57) ABSTRACT

An oil recovery method by the modification of the rock wettability from hydrophilic to oleophilic using hydrophobic compounds. Specifically, the method relates to the application of oil-type emulsions in water based on hydrophobic compounds free of silicon and fluorine to increase the oil recovery in mature sandstone-type reservoirs after the injection of water.

16 Claims, 2 Drawing Sheets

(56) References Cited

OTHER PUBLICATIONS

Rocha De Farias, M.L. et al., A Comparative Study of Emulsion Flooding and other IOR Methods for Heavy Oil, 2012, SPE 152290.

Lakatos, I. et al., Application of Silicone Microemulsion for Restriction of Water Production in Gas Wells, 2002, SPE 78307.

Lakatos, I. et al., Comparative Study of Different Silicone Compounds as Candidates for Restriction of Water Production in Gas Wells, 2003, SPE 80204.

Lakatos, I. et al., New Alternatives of Water Shutoff Treatments: Application of Water Sensitive Metastable Systems, 2008, SPE 112403.

Fridman, G. et al., Surfactant Compositions with High Sweepout Effect for Increasing Well Injectivity and Enhanced Oil Recover, A004 12th European Symposium on Improved Oil Recovery, 2003.

Guillen, V.R. et al., Pore Scale and Macroscopic Displacement Mechanisms in Emulsion Flooding, Transp Porous Med (2012) 94:197-206.

Guillen, V.R. et al., Capillary-driven mobility control in macro emulsion flow in porous media, International Journal of Multiphase Flow 43 (2012) 62-65.

Romero, L. et al., Plugging of High Permeability—Fractured Zones Using Emulsions, 1996, SPE/DOE 35461.

Cobos, S. et al., Flow of oil—water emulsions through a constricted capillary, International Journal of Multiphase Flow 35 (2009) 507-515.

Taylor, K. et al., Emulsions in Enhanced Oil Recovery, ACS 1992.

Romero, M.I. et al. Experiments and network model of flow of oil-water emulsion in porous media, Physical Review E 84, 046305 (2011).

Feng, C. et al., Wettability modification of rock cores by fluorinated copolymer emulsion for the enhancement of gas and oil recovery, Applied Surface Science 258 (2012) 7075-7081.

Jeirani, Z. et al., Formulation, optimization and application of triglyceride microemulsion in enhanced oil recovery, Industrial Crops and Products 43 (2013) 6-14.

Rao, D. et al., The influence of reservoir wettability on waterflood and miscible flood performance, The Journal of Canadian Petroleum Technology 31 (1992) 47-55.

Di, Q. et al., Innovative Drag Reduction of Flow in Rock's Micro-channels Using Nano Particles Adsorbing Method, 2010, SPE 130994.

Mandal, A. et al., Characterization of Oil-Water Emulsion and Its Use in Enhanced Oil Recovery, Ind. Eng. Chem. Res. 2010, 49, 12756-12761.

Santanna, V.C. et al., Microemulsion flooding for enhanced oil recovery, Journal of Petroleum Science and Engineering 66 (2009) 117-120.

McAuliffe, C. et al., Oil-in-Water Emulsions and Their Flow Properties in Porous Media, 1973, SPE 4369.

McAuliffe, C. et al., Crude-Oil-in-Water Emulsions to Improve Fluid Flow in an Oil Reservoir, 1973, SPE 4370.

* cited by examiner

HYDROPHOBIC COMPOUND EMULSIONS FREE OF SILICON AND FLUORINE FOR AN OIL RECOVERING METHOD THAT MODIFIES THE WETTABILITY OF ROCKS FROM HYDROPHILIC TO OLEOPHILIC

CROSS-REFERENCE TO RELATED APPLICATION

This application claims the benefit and priority under 35 U.S.C. § 119 to Mexican Patent Application No. MX/a/2013/006892 with a filing date of Jun. 17, 2013, the disclosure of which is incorporated herein by reference in its entirely.

FIELD OF THE INVENTION

The present invention is directed to emulsions of hydrophobic compounds for an oil recovering method that modifies the rock wettability from hydrophilic to oleophilic. More specifically, the invention is directed to the use of oil-type emulsions in water that are based on hydrophobic compounds free of silicon and fluorine for increasing the recovery of oil in mature wells in sandstone-type reservoirs after the injection of water.

BACKGROUND OF THE INVENTION

In most oil reservoirs, when their natural energy is not enough for extracting oil efficiently, either the tertiary or secondary recovery processes are used to increase the production. Currently, around 70% of the world oil production comes from fields that are more than 30 years old, which has drawn the attention of the industry to mature fields (also known as marginal fields) whose production is declining. Mature fields are found all over the world.

In the Gulf of Mexico continental plate there is a number of mature fields that are in advanced stages of their productive lives. In water-wettable-sand reservoirs, which contain intermediate oil and are at a decaying oil production stage, the use of the secondary recovery by water presents potential risks such as early water irruption in the production well.

Part of the oil that is found in the pores is residual oil, but a large amount of oil is located at zones that are neither connected nor swept by water, which makes the production wells yield a high percentage of water. In this case, the application of polymers or alkalis hardly increases the production rate because these compounds are dragged along with the water flow in the production well.

Occasionally, the injection of mixtures of such additives (ASP) can work well, but they are very selective and sometimes the extraction does not achieve a good recovery factor; in other cases, the gel or foam application program is used to control water, which represents normally a high production cost. Currently, the world trend for diminishing the water production in oil fields is based on the following methods: application of triblock polymers, in-situ generation of polymeric gels [SPE 94660 K. Elewaut et al.], injection of oil-type emulsions in water stabilized with surfactants [SPE 152290 M. L. Rocha de Farias et al.], and injection of silicon-based emulsions for rock hydrophobization.

The last method, which was used successfully in the Algyö oil fields in Hungary [I. Lakatos et al. SPE 78307; I. Lakatos et al. SPE 80204; I. Lakatos et al. SPE 112403], and in the Yuzhno-Balykskoye and Romanshkinsky fields in Russia [Burger et al. Process for the extraction of crude oil. U.S. Pat. No. 5,630,474 (1997); G. B. Fridman et al. A004 12th European Symposium on Improved Oil Recovery—Kazan, Russia, 8-10 Sep. 2003], is based on different mechanisms: 1) alteration of the rock wettability to be oil wettable, modifying the capillary forces; 2) zone partial blockage by plugging the rock pores by the emulsion disperse phase; and 3) modification of the relative permeability, which provokes the reduction of water mobility [V. R. Guillen et al. Transport in Porous Media, V. 86(2) 2011; V. R. Guillen et al. International Journal of Multiphase Flow, 2012; L. Romero et al. SPE/DOE 35461; S. Cobos et al. International Journal of Multiphase Flow 35 (2009) 507-515; K. Taylor ACS 1992; M. I. Romero et al. Physical Review. E 84, 046305 (2011)].

The injection of water with the aqueous emulsion batch could be an option for the recovery of oil in sandstone fields flooded with water or that contain oil with approximately 20° API gravity, where the application of ASP technologies, injection of polymers, gels or foams can represent technological problems or high costs.

U.S. Pat. No. 4,197,912 discloses an oil extraction process using a mixture of organic silicon compounds dispersed or dissolved in hydrocarbons. However, the amount and concentration of the chemical compounds do not make this process financially feasible. U.S. Pat. No. 4,074,536 discloses a rock hydrophobization process using organic silicon compounds, which form a thin layer on the rock surface and work as water repellents. U.S. Pat. Nos. 4,296,812 and 4,230,182 disclose similar oil recovery processes by means of emulsions, where the continuous phase is the surfactant aqueous solution and the dispersed phase contains 15% dialkylsiloxane hydrocarbons.

U.S. Pat. No. 6,165,948 and the paper by Chunyan Feng et al. [Chunyan Feng, Ying Kong, Guancheng Jiang, Jinrong Yang, Chunsheng Pu, Yuzhong Zhang, *Wettability modification of rock cores by fluorinated copolymer emulsion for the enhancement of gas and oil recovery,* Applied Surface Science 258 (2012) 7075-7081] refer to a rock hydrophobization method by using hydrophobic substances such as silicon-based waxes, polyethylene or fluorinated compounds. Jeirani et al. [Z Jeirani, B. Mohamed Jan, B. Si Ali, I. M. Noor, C. H. See, W. Saphanuchart, *Formulation, optimization and application of triglyceride microemulsion in enhanced oil recovery,* Industrial Crops and Products 43 (2013) 6-14], disclose the application of triglyceride-based microemulsions for the tertiary recovery of oil. In addition, the researchers at the Alberta Petroleum Institute, Rao et al. [D. N. Rao, M. Girard, S. G. Sayegh, *The influence of reservoir wettability on waterflood and miscible flood performance.* PETSOC 92-06-05, 31 (1992) 47-55] concluded from the performed studies that the oil recovery by water injection is more efficient in mixed wettability systems. In the SPE 130994 paper [Q. Di, C. Shen, Z Wang, B. Jing, C. Gu, Y. Qian, *Innovative Drag Reduction of Flow in Rock* SPE 130994 (2010)], the authors studied the rock hydrophobization process to reduce the dragging flow rate (water), enhancing the oil extraction process.

There are diverse publications related to the application of emulsions based on either oil itself or its fractions and an emulsifier for oil recovering, for example, Ajay et al. in the paper published in Ind. Eng. Chem. Res. 2010, 49, 12756-12761 reported additional oil recovery up to 23% using an O/W-type emulsion with cog-wheel oil. On the other hand, V. C. Santana et al. featured in the Journal of Petroleum Science and Engineering 66 (2009) 117-120 a successful oil recovery test in a sand package by using an oil microemulsion. McAuliffe, at the 1972 Symposium in Tulsa, presented a research work (SPE 4369, SPE 4370) based on the development and application of the oil emulsion injection method (at 14% concentration) for tertiary recovery in the Midway-Sunset oil field in the United States. Nevertheless, in the literature, no injection method of emulsions free of siloxanes, fluorinated compounds or polymers for rock hydrophobization for additional oil recovery has been described so far.

SUMMARY OF THE INVENTION

Although excellent results have been obtained with many of the methods described above and other patents, the present invention surpasses them by far by providing hydrophobic substances free of silicon and fluorine, which are used in the preparation of the oil-type emulsions for increasing the oil recovery rate in sandstone-type mature reservoirs after the injection of water.

Thus, the aim of the present invention is to provide new O/W-type emulsions based on hydrophobic compounds free of silicon and fluorine. The emulsions comprise or consist of: 1) hydrophobic compound (A) in liquid phase at room temperature and insoluble in water, whose general formula is $C^+ Y^-$, where $C^+$ represents an organic cation, specifically, although it is not limited to the tetralkylammonium, trialkylsulfonium and tetralkylphosphonium type, where the anion $Y^-$ is represented by halides or carboxylic, sulfonic and dicarboxylic acid derivatives with different substitutes; 2) aqueous solution of emulsifier (B), which is represented by a commercial non-ionic tensoactive derived from polyethoxyethanol with different length and ramification chains; in addition, it is soluble in water for additional oil recovery methods after the water injection process in sandstone-type reservoirs. In one embodiment, cation $C^+$ is an alkyl ammonium carboxylate, such as trioctylmethyl ammonium octanoate.

An additional goal of the present invention is the use of emulsions based on the hydrophobic compounds mentioned above in order to modify the rock wettability from water wettable to oil wettable, forming hydrophobic sites on the hydrophilic rock and creating mixed wettability, where the hydrophobic surfaces offer a new route for water, reconnecting the isolated oil so that the oil escapes from the zones that are practically full of water, thus increasing the oil recovery in the sandstone-type mature oil reservoirs after the injection of water.

The invention is also directed to a method of enhancing crude oil recover from oil wells such as wells in porous sand stone. The method is suitable for mature wells where the crude oil is retained in the rock and is not easily recovered. The method in one embodiment introduces water into the well followed by the emulsion of the hydrophobic compound (A) and the emulsifier (B) in an amount sufficient to allow the oil to separate from the rock. The crude oil can then be recovered from the well. The emulsions of the invention can also be used in a method of enhancing the oil wettability and/or oil affinity of the rock and treating the rock to modify the properties of the rock to enhance the oil wettability. In one embodiment of the invention, the emulsion is an aqueous emulsion where the emulsifying components consist essentially of a hydrophobic compound (A) and an emulsifier (B) selected from the group consisting of alkyl sulfates having a $C_8$-$C_{18}$ alkyl, alkyl ether sulfates having 1-40 ethylene oxide or propylene oxide units, alkylpolyglycol ethers having 2-40 ethylene oxide units and a linear or branched $C_2$-$C_{10}$ alkyl, and polyethoxylated alkylpolyphenol ethers having 2-40 ethylene oxide units and a linear or branched $C_2$-$C_{40}$ alkyl.

BRIEF DESCRIPTION OF THE DRAWINGS

In order to have a better understanding of the additional oil recovery method by modifying the rock wettability from hydrophilic to oleophilic using hydrophobic compound emulsions free of silicon and fluorine, the drawings featured in the present invention are described as follows.

DETAILED DESCRIPTION OF THE INVENTION

Figure 1:
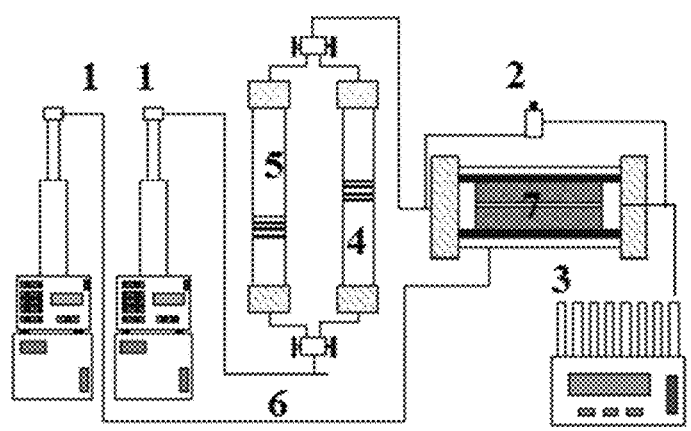
FIG. 1 depicts a diagram of the injection system used in the test, where 1 indicates the injection pumps, 2—pressure differential, 3—effluent collector, 4 and 5—transfer cylinders, 6—confinement pressure, 7—rock core or sand package.

The present invention relates to an emulsion and to a new method for recovering additional oil after the process of injecting water in mature fields in sandstone-type reservoirs by the injection of O/W-type emulsions based on hydrophobic compounds free of silicon and fluorine. The emulsions comprise or consist of: 1) hydrophobic compound (A) in liquid phase at room temperature and insoluble in water, whose general formula is $C^+ Y^-$, where $C^+$ represents an organic cation, specifically, although it is not limited to the tetralkylammonium, trialkylsulfonium and tetralkylphosphonium type, where the anion $Y^-$ is represented by halides or carboxylic, sulfonic and dicarboxylic acid derivatives with different substitutes; 2) aqueous solution of an emulsifier (B), which is represented by a commercial non-ionic tensoactive derived from polyethoxyethanol with different length and ramification chains; and is soluble in water.

More specifically, the present invention refers to the preparation of emulsions based on hydrophobic compounds (A) (as shown in Table 1) free of silicon and fluorine that are liquids at room temperature and immiscible in water.

Emulsifier (B) can be chosen from the following surfactants with hydrophilic-lipophilic balance value (HLB) above 10:

1. Alkyl sulfates, which have an alkyl chain length from 8 to 18 carbon atoms; alkyl ether sulfates with an alkyl chain from 8 to 19 carbon atoms, which contain 1-40 unit blocks of ethylene oxide or propylene.

2. Alkylpolyglycol ethers, which have from 2 to 40 ethylene oxide units and from 2 to 40 carbon atoms in the alkyl chain which can be either linear or branched.

3. Polyethoxylated alkylpolyphenol ethers, which have from 2 to 40 ethylene oxide units and from 2 to 40 carbon atoms in the alkyl chain which can be either linear or branched.

TABLE 1

General structure of the cations and anions that form the hydrophobic compounds (A) in the present invention.

$C^+$ (Cations)

| Ammonium | Phosphonium | Sulfonium |
|---|---|---|
| $R\underset{\oplus}{\overset{R_1}{\underset{|}{\overset{|}{N}}}}R_2$ $R_3$ | $R\underset{\oplus}{\overset{R_1}{\underset{|}{\overset{|}{P}}}}R_2$ $R_3$ | $R\overset{\oplus}{\underset{R_3}{\overset{|}{S}}}R_1$ | where R, $R_1$, $R_2$, $R_3$ are independently aliphatic, benzyl, aromatic, cycloalkyl or alkenyl chains, which can be either linear or branched with 6 to 18 carbon atoms.

TABLE 1-continued

General structure of the cations and anions that form the hydrophobic
compounds (A) in the present invention.

Y⁻ (Anions)

| Carboxylate, Dicarboxylate | Sulfonate | Cl⁻, Br⁻, I⁻ Halides | where $R_4$ is represented by alkyl, cycloalkyl, benzyl alkenyl, aromatic chains or alkyl functionalized, which can be either linear or branched, with 1 to 18 carbon atoms and heterocyclic with 4 to 10 carbon atoms that can contain at least one heteroatom such as nitrogen, sulfur or oxygen and with substitutes formed by alkyl, cycloalkyl, benzyl, alkenyl or aromatic chains or alkyl functionalized and having 1 to 18 carbon atoms.

Preferably, the amount of emulsifier (B) to be used should be 1-20 parts by weight per 100 parts by weight of hydrophobic compound (A). In one embodiment, the amount of emulsifier (B) is effective within the 1-5 parts by weight per 100 parts by weight of the hydrophobic compound (A). In addition, the emulsions can contain small amounts of organic solvents.

In one embodiment, C⁺ is a tetralkylammonium, tetralkylphosphonium or trialkylsulfonium where the alkyl can be a $C_1$-$C_{18}$ alkyl and where one or more of the alkyl group is a $C_6$-$C_{18}$ alkyl. In another embodiment, at least one of the alkyl groups is a lower alkyl group such as methyl, ethyl or propyl and one or more of the alkyl groups is a $C_6$-$C_{18}$ alkyl.

The "ready-to-be-used" emulsion contains: a sum of hydrophobic compounds (A) in an amount of 0.01-25% by weight, preferably 0.05-10% by weight, a sum of surfactants (B) in an amount of 0.0001-1% by weight, preferably 0.0005-0.25% by weight, and the balance added water (to 100). The calculations are based on the total weight of the emulsion to be used.

According to the present invention, the emulsions can be prepared by mixing the components with different combinations. The general method for the preparation of the O/W-type emulsions is carried out according to the following procedure:

The emulsion preparation process is based on the formation of a system, where the disperse phase is a hydrophobic compound (A) or combinations thereof, and the continuous phase is water with emulsifier (B). In order to do so, in the first stage, a "concentrated" emulsion is prepared with 70% by weight of compound (A). In the second stage, the "concentrated" emulsion is diluted with water until it is "ready-to-be-used". The preparation of the "concentrated" emulsion comprises or consists of emulsifier (B) at a concentration of 1-5% by weight, which is dissolved in water, forming an aqueous solution, where one or several hydrophobic compounds (A) are added slowly at a concentration of 70% by weight, mixing at the same time at speeds above 16000 rpm at room temperature.

Once the "concentrated" emulsion has been prepared, the drop size of the disperse phase is measured. The droplet size of the disperse phase of the hydrophobic compound (A) in the prepared emulsion should range preferably from 100 nm to 100 μm. The composition, droplet sizes and concentration of the disperse phase of compound (A) are adjusted according to the rock type and reservoir conditions. The particle size is selected preferably so that the drop diameter is smaller than the diameter of the rock pores. In order to determine the distribution of the droplet size in the prepared emulsions, a Malvern laser diffractometer with measuring interval of 0.02-200 μm was used. In addition, zeta potential (ZP) measurements were performed in order to determine the stability of the emulsions by means of a Z-PALS equipment by Brookhaven with measurement interval of −150 to 150 mV.

For the oil recovery tests, the "ready-to-be-used" emulsions are applied at a concentration of hydrophobic compounds (A) of 0.05-10% by weight based on the weight of the emulsion. In one embodiment, the total amount of compound (A) and emulsifier (B) is about 0.5-10% by weight of the emulsion.

EXAMPLES

The following examples must not be considered as exhaustive, but just as illustrations of some of the many considered for the present invention.

Likewise, it is important to mention that FIG. 1 shows a diagram of the injection system used in the test, where 1 indicates the injection pumps, 2—differential pressure, 3—effluent collector, 4 and 5 transfer cylinders, 6—confinement pressure, 7—rock core or sand package.

Figure 2:
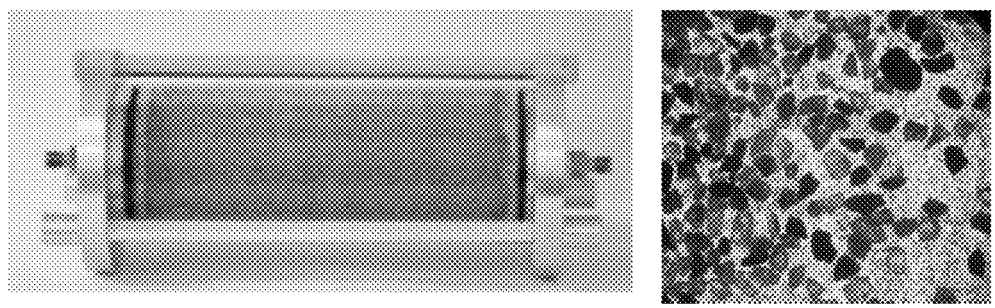
FIG. 2 features a photograph of the sand packed cell.

FIG. 2 features a photograph of the sand packed cell.

Figure 3:
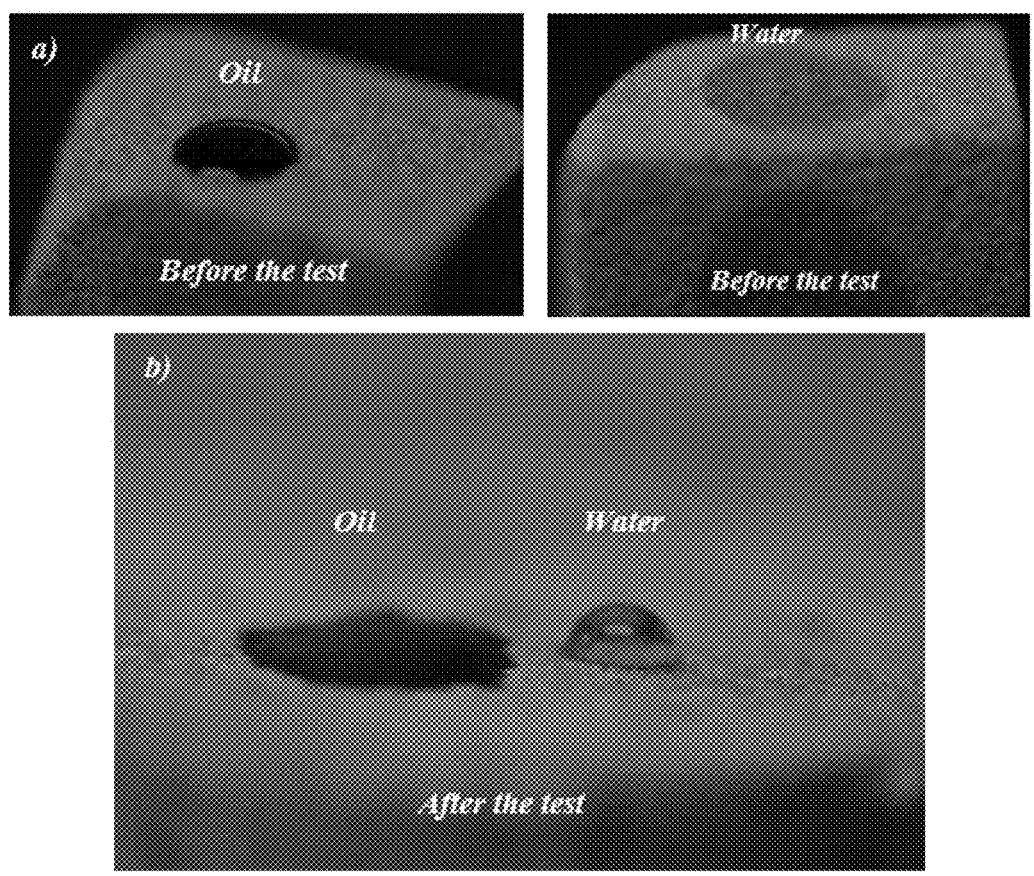
FIG. 3 displays core photographs: a) before the test, and b) after the test with the injection inlet face.

FIG. 3 displays core photographs: a) before the test, and b) after the test with the injection inlet face.

Example 1. Preparation of the Trioctylmethylammonium Octanoate Base Emulsion (Em 1)

In the first stage, the "concentrated" emulsion is prepared in a reactor that is coupled to the mechanical mixing system Ultra Turrax T25 Basic, by adding 1 g of Igepal CO 890 (emulsifier B) and 29 g of deionized water. The mixture is stirred until a transparent solution is formed. Afterwards, 70 g of trioctylmethylammonium octanoate (hydrophobic compound A), which has been synthesized previously, are added dropwise. The mixture is stirred at 16000 rpm for 15 min in order to form a visually homogeneous mixture. Igepal CO 890 is a polyoxyethylene (40) nonylphenyl ether having a number average molecular weight $M_n$ of about 1,982 and an HLB of 17 from Sigma-Aldrich Co.

Afterwards, in the second stage, the preparation of the "ready-to-be-used" emulsion is carried out. In order to do so, in a glass reactor equipped with a stirring system, 1 g of "concentrated emulsion", which was obtained in the first stage, is dissolved in 34 g of deionized water.

The obtained emulsion (Em 1) is analyzed in the diffractometer to determine the drop size of the disperse phase. The analysis data are shown in Table 2.

TABLE 2

Distribution of the drop size in the
emulsions Em1-Em3 by the laser dispersion technique.

| | | Drop Size Distribution | | |
|---|---|---|---|---|
| No | ZP (mV) | $D_{10}$ | $D_{50}$ | $D_{90}$ |
| Em1 | 33.4 | 0.24 | 0.24 | 4.53 |
| Em2 | 38.4 | 0.09 | 0.24 | 3.59 |
| Em3 | 58.9 | 1.84 | 2.92 | 4.59 |

$D_x$: Drop diameter so that the X % of the liquid total volume is in lower size drops.

The emulsions Em2 and Em3 are obtained by using the same procedures described in Example 1 with the difference of using the hydrophobic compounds A and the concentrations of the "ready-to-be-used" emulsions different from those in Example 1.

Example 2. Oil Displacement Tests in Rock Cores

The examples concerning the oil recovery tests were carried out by using Berea rock cylindrical cores (7 in FIG.

1) with a diameter of 3.8 cm and a length of 8.2 cm. First, the cores are saturated with water and afterwards with Mexican "Maya" crude oil with 21° API gravity. Once the rock fragment is under the established oil saturation conditions, the oil recovery is carried out by injecting bidistilled water at a flux of 10 ml/h, as shown in FIG. 1, using injection pumps (1) and transfer cylinders (4 and 5). After injecting bidistilled water, 0.4 PV (pore volume) of chemical product (Em1) are injected at the injection inlet in order to continue with the injection of bidistilled water at a flux of 10 ml/h.

The oil volume recovered from the core (3 in FIG. 1) is measured and compared with the oil volume of the initial saturation of the rock core. The recovery efficiency is proportional to the displaced oil amount during the test in comparison with the total oil volume contained in the core at the beginning of the test, which is considered as 100%. The amount of additional oil displaced from the core ($R_{emulsion}$) by the injection of emulsion is calculated and is referred to as the emulsion displacement efficiency.

The following experiments Em2 and Em3 are performed with new rock cores and the different hydrophobic compounds as the active substance in the emulsions mentioned in Table 1.

The oil production was evaluated for approximately 20 h (T) at 20° C. The pore volume (PV), porosity ($\Phi$), absolute permeability in milidarcies ($K_{abs}$), the initial oil saturation volumes ($So_{in}$), the volumes and oil recovery percentage by water injection ($R_{water}$) and emulsion ($R_{emulsion}$) are shown in Table 3.

Example 3. Oil Displacement Test in the Sand Packages

In order to evaluate the effect of the emulsions on the oil recovery in systems with higher permeability and pore volume, the decision of producing sand packages was made. For this oil recovery tests, packed-meshed-beach-sand cells with 13 cm in length and 4.5 cm in diameter were used. The sand features a nominal diameter below 250 µm, as shown in FIG. 2.

TABLE 3

Data of the rock core tests.

| Emulsion | $\phi$ (%) | VP (ml) | $K_{abs}$ (MD) | $So_{in}$ % | ml | $R_{water}$ % | ml | $R_{emulsion}$ % | ml | T (h) |
|---|---|---|---|---|---|---|---|---|---|---|
| Em1 | 21.5 | 20.4 | 211.2 | 84 | 17.1 | 58.9 | 10.07 | 15.4 | 2.6 | 24 |
| Em2 | 21.8 | 21 | 228.8 | 74.3 | 15.6 | 66.2 | 10.25 | 22.6 | 3.5 | 20 |
| Em3 | 21.7 | 21 | 246.6 | 80.5 | 16.9 | 57.5 | 9.7 | 22.5 | 3.8 | 20 |

Once the cell is under the established Maya oil saturation conditions (20.1° API, 544 mPa·s, 0.9317 g/mL at 20° C.; Oil 90/Water 10), the oil recovery by injection of bidistilled water at a flux of 10 ml/h is performed. After water displacement, the corresponding emulsion at 0.1 PV was injected at the inlet in order to continue injecting water at a flux of 10 ml/h. Afterwards, the injection procedure, data recovery and computations were determined as in Example 2. The results of the oil displacement in the sand packages within 30 h (T) at 20° C. are shown in Table 4.

Example 4. Modification of the Rock Wettability from Hydrophilic to Oleophilic

In order to investigate water repellency and modification of the rock wettability towards oil as a consequence of the emulsions based on hydrophobic compounds, rock core samples were used before and after the oil displacement test featured in Example 2. FIG. 3 shows that the surface contact angle of the water drop was increased evidently after the emulsion treatment. In other words, the rock surface wettability was modified preferentially from water to oil wettable.

TABLE 4

Data of the sand package tests.

| Emulsion | $\phi$ (%) | VP (ml) | $K_{abs}$ (MD) | $So_{in}$ % | ml | $R_{water}$ % | ml | $R_{emulsion}$ % | ml | T (h) |
|---|---|---|---|---|---|---|---|---|---|---|
| Em1 | 41 | 85.1 | 300.1 | 88.74 | 75.5 | 46.5 | 35.24 | 3.3 | 2.5 | 30 |
| Em2 | 39.6 | 82.2 | 382.1 | 86.9 | 71.5 | 43.2 | 30.9 | 17.7 | 12.7 | 36 |
| Em3 | 39.7 | 82.3 | 326.7 | 82.60 | 68 | 52.2 | 35.5 | 9.6 | 6.5 | 26 |

The emulsions used in the present invention were used as both wettability change of the sandstone towards oil wettable and additional oil recovery agents.

The examples of the hydrophobic emulsions free of silicon and fluorine used in the examples regarding the recovery of additional oil and the modification of the rock wettability, in addition to the example discussing the preparation of such emulsions, must not be considered as exhaustive, but just mere illustrations of just some among the several examples considered for the present invention.

What is claimed is:

1. A method of increasing oil production of wells in mature sandstone rock, comprising the steps of:
   introducing an oil-in-water emulsion into the well to modify the wettability of the sandstone rock, said emulsion comprising (1) a hydrophobic compound (A), where said compound (A) is a liquid phase at room temperature, insoluble in water and free of silicon and fluorine, and (2) an aqueous solution of an emulsifier (B), and recovering oil from the well,
   wherein said hydrophobic compound (A) has the formula $C^+Y^-$ where $Y^-$ is an organic anion selected from the group consisting of chlorine, bromine, iodine, an organic carboxylate, an organic dicarboxylate, an organic sulfonate, and $C^+$ is a cation selected from the group consisting of quaternary phosphonium cation; and an organic trialkyl sulfonium cation, and (B) is an alkyl sulfate, alkylpolyglycol ether or polyethoxylated alkyl polyphenol ether.

2. The method of claim 1, wherein the total amount of said compound (A) and emulsifier (B) is about 0.05-10% by weight based on the total weight of the emulsion.

3. The method of claim 1, wherein said aqueous solution of emulsifier (B) in said emulsion is present in an amount of 1 to 20 parts by weight per 100 parts by weight of said hydrophobic compound (A).

4. The method of claim 1, wherein said emulsifier (B) has an HLB of 10 or above and is selected from the group consisting of alkyl sulfates, alkyl ether sulfates, alkylpolyglycol ethers and polyethoxylated alkylphenol ethers having a linear or branched $C_8$-$C_{18}$ alkyl and containing 1-40 ethylene oxide or propylene oxide groups.

5. The method of claim 1, wherein said compound (A) in said emulsion has a droplet size of about 100 nm to 100 μm, and where said droplet size is smaller than a pore size of said sandstone rock.

6. The method of claim 1, wherein $C^+$ has the formula:

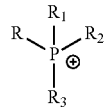

where R, $R_1$, $R_2$, $R_3$ are independently selected from the group consisting of aliphatic, benzyl, aromatic, cycloalkyl and alkenyl chains, either linear or branched, with 6 to 18 carbon atoms.

7. The method of claim 1, wherein C has the formula:

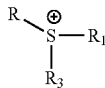

where R, $R_1$, $R_3$ are independently selected from the group consisting of aliphatic, benzyl, aromatic, cycloalkyl and alkenyl chains, either linear or branched, with 6 to 18 carbon atoms.

8. The method of claim 1, wherein $Y^-$ has the formula:

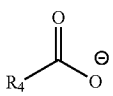

where $R_4$ is selected from the group consisting of alkyl, cycloalkyl, benzyl, alkenyl, aromatic chains or alkyl functionalized, either linear or branched, with 1 to 18 carbon atoms and heterocyclic compounds having 4 to 10 carbon atoms that contain at least one heteroatom selected from the group consisting of nitrogen, sulfur and oxygen and with substitutes formed by alkyl, cycloalkyl, benzyl, alkenyl or aromatic chains or alkyl functionalized with 1 to 18 carbon atoms.

9. The method of claim 1, wherein $Y^-$ has the formula:

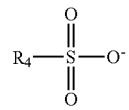

where $R_4$ is selected from the group consisting of alkyl, cycloalkyl, benzyl alkenyl, aromatic chains or alkyl functionalized, either linear or branched, with 1 to 18 carbon atoms and heterocyclic compounds having 4 to 10 carbon atoms that contain at least one heteroatom selected from the group consisting of nitrogen, sulfur and oxygen and with substitutes formed by alkyl, cycloalkyl, benzyl, alkenyl or aromatic chains or alkyl functionalized with 1 to 18 carbon atoms.

10. The method of claim 1, wherein said emulsion comprises 0.01-25% by weight of said hydrophobic compound (A), 0.0001-1% by weight of said emulsifier (B), and the balance water.

11. A method of increasing oil production of wells in mature sandstone rock, comprising the steps of:
introducing an oil-in-water emulsion into the well to modify the wettability of the sandstone rock, said emulsion comprising (1) a hydrophobic compound that is a liquid at room temperature, insoluble in water and free of silicon and fluorine, and (2) an aqueous solution of an emulsifier (B), and
recovering oil from the well,
wherein said hydrophobic compound (A) has the formula $C^+Y^-$ where
$Y^-$ is an organic anion selected from the group consisting of chlorine, bromine, iodine, an alkyl carboxylate, a cycloalkyl carboxylate, a benzyl alkenyl carboxyl ate, an alkyl sulfonate, cycloalkyl sulfonate, and benzyl alkenyl sulfonate, and
$C^+$ is a cation selected from the group consisting of quaternary phosphonium cation and an organic trialkyl sulfonium cation, and
(B) is a surfactant having an HLB above 10 and selected from the group consisting of a $C_{8-18}$ is alkyl sulfate, $C_{8-19}$ alkyl ether sulfate, a $C_{2-40}$ alkylpolyglycol ether, and a $C_{2-40}$ alkyl polyethoxy polyphenol ether, and where said emulsion comprises 1-5 parts by weight of said surfactant (B) based on 100 parts of said hydrophobic compound (A).

12. The method of claim 11, wherein said hydrophobic compound (A) has $Y^-$ which is a $C_{1-18}$ carboxylate anion.

13. The method of claim 1, wherein said hydrophobic compound is trioctylammonium octanoate.

14. The method of claim 11, wherein $Y^-$ is an alkyl carboxylate anion.

15. The method of claim 1, wherein said organic trialkyl sulfonium cation is a trialkyl sulfonium cation having the formula

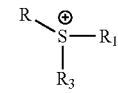

where R, $R_1$, and $R_3$ are independently a $C_6$ to $C_{18}$ alkyl.

16. The method of claim 1, wherein said quaternary phosphonium cation has the formula

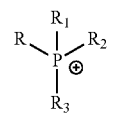
where R, $R_1$, $R_2$, and $R_3$ are independently a $C_6$ to $C_{18}$ alkyl.
* * * * *